(12) United States Patent
Görne et al.

(10) Patent No.: US 8,974,054 B2
(45) Date of Patent: Mar. 10, 2015

(54) CONTACT LENS

(71) Applicant: LensWista AG, Berlin (DE)

(72) Inventors: Martin Görne, Hamburg (DE); Thomas Kordick, Goldbach (DE)

(73) Assignee: LensWista AG, Berlin (DE)

( * ) Notice: Subject to any disclaimer, the term of this patent is extended or adjusted under 35 U.S.C. 154(b) by 0 days.

(21) Appl. No.: 14/351,509

(22) PCT Filed: Feb. 1, 2013

(86) PCT No.: PCT/EP2013/000326
§ 371 (c)(1),
(2) Date: Apr. 11, 2014

(87) PCT Pub. No.: WO2013/083856
PCT Pub. Date: Jun. 13, 2013

(65) Prior Publication Data
US 2014/0347621 A1    Nov. 27, 2014

(30) Foreign Application Priority Data
Feb. 1, 2012  (EP) ................................. 12000660

(51) Int. Cl.
*G02C 7/04* (2006.01)
*B29D 11/00* (2006.01)
*B29C 39/02* (2006.01)

(52) U.S. Cl.
CPC .............. *G02C 7/049* (2013.01); *B29C 39/02* (2013.01)
USPC ..................... 351/159.02; 264/2.1; 264/2.2

(58) Field of Classification Search
USPC ..................... 351/159.02; 264/2.1, 2.2, 2.3
See application file for complete search history.

(56) References Cited

U.S. PATENT DOCUMENTS

| | | | |
|---|---|---|---|
| 4,042,652 A | 8/1977 | Feneberg | |
| 4,285,890 A | 8/1981 | Mizutani et al. | |
| 4,955,711 A | 9/1990 | Wise et al. | |
| 5,466,147 A | 11/1995 | Appleton et al. | |
| 6,310,116 B1 | 10/2001 | Yasuda et al. | |
| 6,444,145 B1 | 9/2002 | Clutterbuck | |
| 7,320,587 B2 | 1/2008 | Goodenough et al. | |
| 2003/0008063 A1 | 1/2003 | Chabrecek et al. | |
| 2004/0075182 A1 | 4/2004 | Gobron | |
| 2006/0006558 A1* | 1/2006 | Yamada | 264/2.2 |
| 2007/0035693 A1 | 2/2007 | Back | |

FOREIGN PATENT DOCUMENTS

| | | |
|---|---|---|
| DE | 24 14 928 | 6/1975 |
| DE | 87 10 765 | 3/1987 |
| EP | 0 908 476 | 4/1999 |

(Continued)

OTHER PUBLICATIONS

International Search Report for International Patent Application PCT/EP2013/000326 mailed Apr. 3, 2013.

(Continued)

*Primary Examiner* — Scott J Sugarman
(74) *Attorney, Agent, or Firm* — Morris & Kamlay LLP

(57) ABSTRACT

A silicone contact lens has a radial cross-section of the inner face, the rim portion contour of which is convex between a point of inflection and the outer edge. For its manufacture, a silicone precursor is brought between a female and a male mold and is polymerized, and the polymerized contact lens is released from the mold by means of a liquid swelling same.

20 Claims, 4 Drawing Sheets

(56) References Cited

FOREIGN PATENT DOCUMENTS

| | | |
|---|---|---|
| JP | S53134456 | 1/1978 |
| JP | S63040293 | 2/1988 |
| JP | H011187527 | 7/1989 |
| JP | H06510486 | 11/1994 |
| JP | H08505295 | 6/1996 |
| JP | H11172149 | 6/1999 |
| JP | 2003508268 A | 3/2003 |
| JP | 2004001473 | 1/2004 |
| JP | 2004536633 | 12/2004 |
| JP | 2007045157 A | 2/2007 |
| JP | 2007048703 A | 2/2007 |
| WO | 9304848 | 3/1993 |
| WO | 9411118 A1 | 5/1994 |
| WO | 2001017756 | 3/2001 |
| WO | 2011/050365 | 4/2011 |
| WO | 2011050365 | 4/2011 |

OTHER PUBLICATIONS

First Office Action mailed Jun. 17, 2014 in corresponding Japanese Application No. JP 2014-522122.

* cited by examiner

CONTACT LENS

The present application relates to a "soft" contact lens with excellent wearing properties.

Conventional contact lenses, e.g. those known from the German utility model publication G 87 10 765 U1, have a radially inner part made of a harder material, and a radially outer part made of a softer material. The inner surface is entirely concave and the outer surface entirely convex, i.e. both surfaces have a positive Gaussian curvature. This known lens is not satisfactory with regard to its wearing comfort.

The invention aims at providing a contact lens having good or even excellent wearing comfort, and a method for its manufacture.

This problem is solved by a contact lens made of silicone, wherein a radial cross section on the inner face has a rim region between a point of inflection and the outer edge in which the cross section contour is convex, in particular with a radius of between 0.1 and 10 mm. Because of this rim contour, the lens particularly readily slips onto the tear liquid film.

According to another aspect, the problem is solved by a process in which a silicone precursor material is brought in between a female and a male mold and is polymerised, and the polymerised contact lens is removed from the mold by means of a liquid swelling the contact lens and completed without edge cutting. Thereby the occurrence of a cutting edge, which might be perceived as irritating, is avoided.

Figure 1:
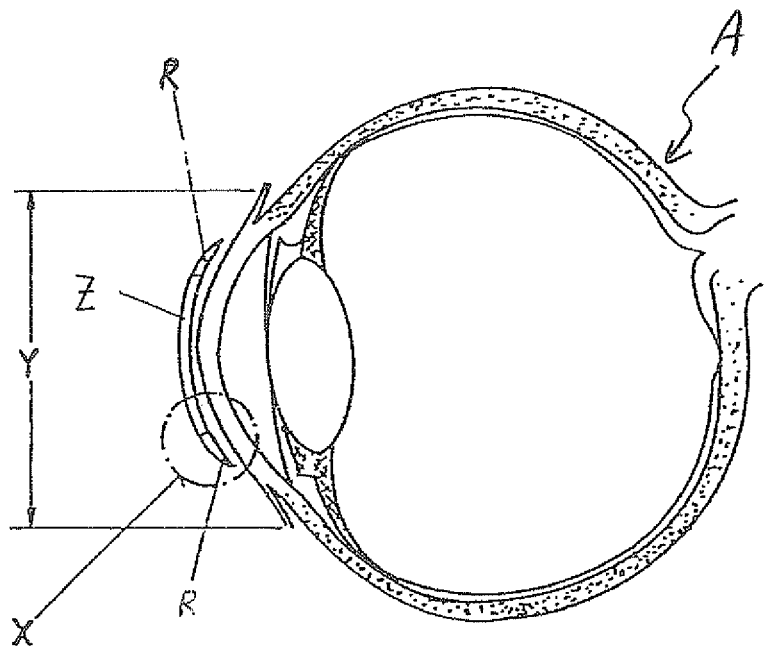
Figure 2:
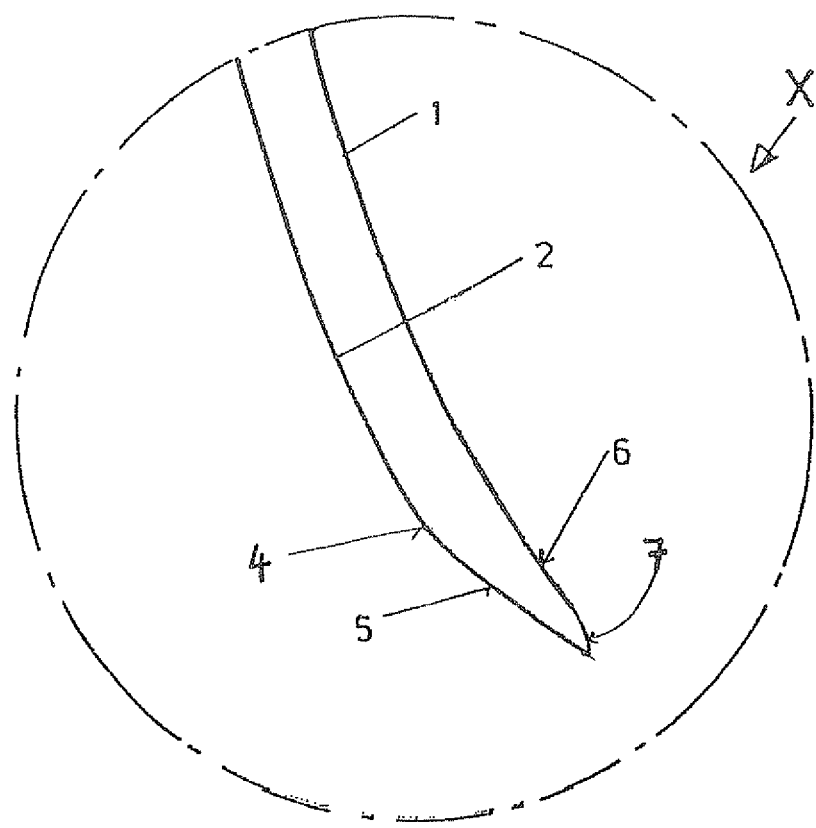
Figure 3:
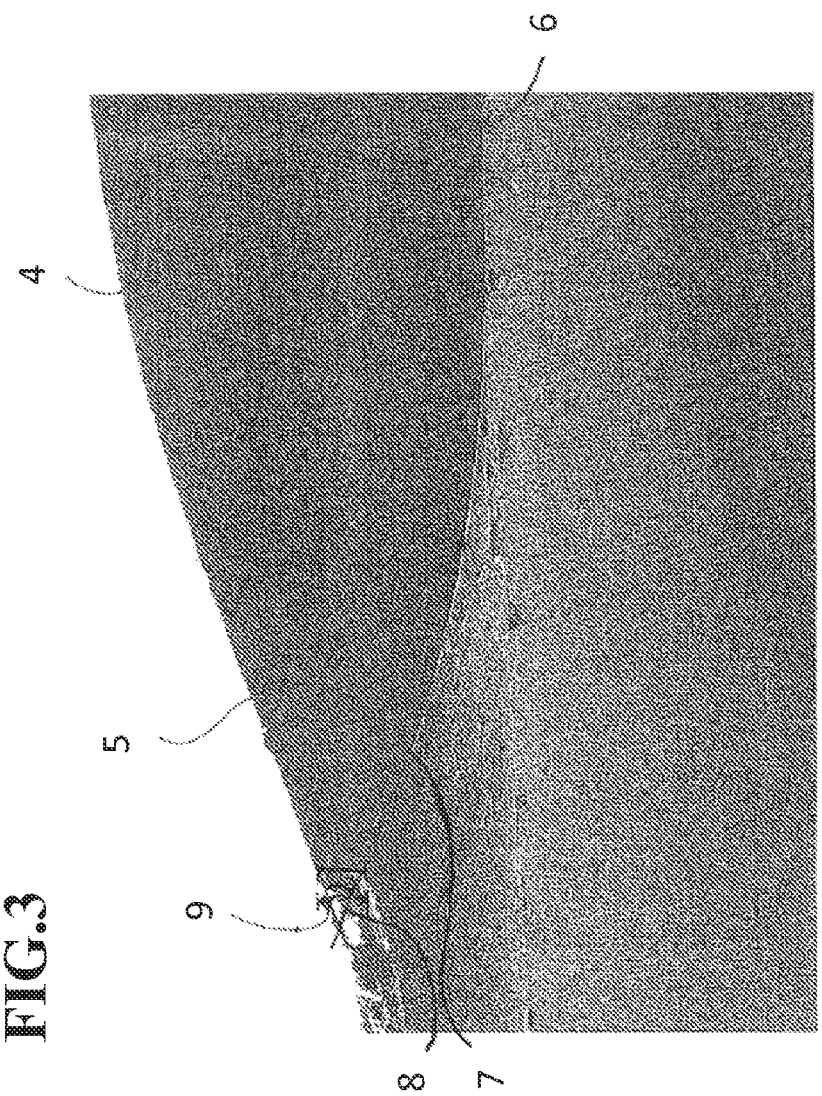
Figure 4:
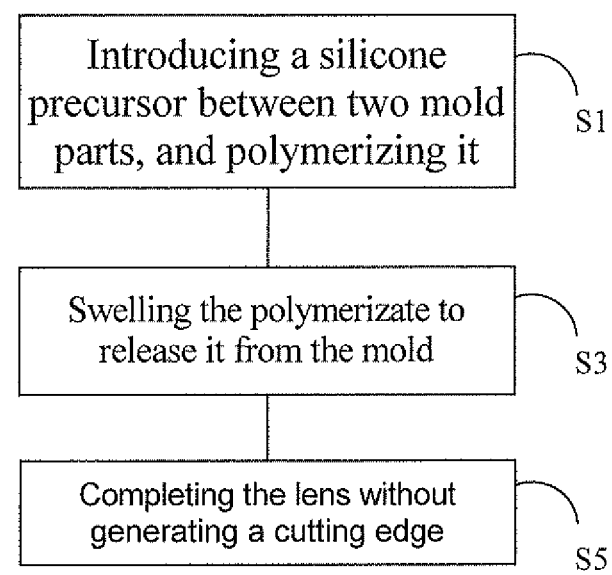
Figure 5:
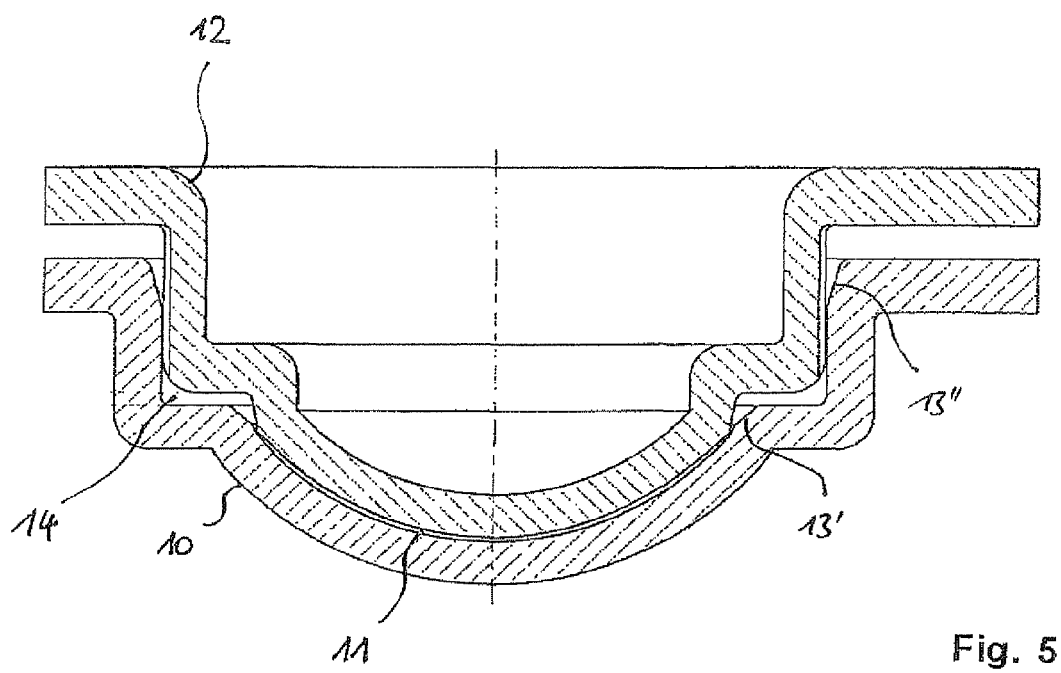

Further features of the invention are available from the subsequent description of embodiments in conjunction with the claims and the drawings. The invention is not limited to the described embodiments, but defined by the scope of the appended claims. In particular, individual features of embodiments of the invention may be realized in a different number or combination than in the examples explained hereunder. In the following explanation of embodiments reference is made to the appended drawings, which show:

FIG. 1 a schematic cross-sectional view of a contact lens placed on the cornea of an eye, FIG. 2 a schematic close-up view of a rim portion of the contact lens of FIG. 1, FIG. 3 an electron-microscopic image of the rim portion of the contact lens, FIG. 4 a flow diagram for a manufacturing method of the contact lens according to the invention, and FIG. 5 a cross-sectional view of a molding apparatus suitable for the manufacturing according to FIG. 4.

The general shape of a contact lens is shown in FIGS. 1 and 2: The inner face 1 facing the cornea, which face, in use, floats on a film of tear liquid, is concave in its central part Z, namely rotationally symmetric-aspheric with a conus coefficient of about −0.1 to −0.5, thus somewhat elliptically pointed. In principle, this face also may deviate from the rotational symmetry if required by the physiological conditions. The outer face 2 of the lens is naturally convex with radius somewhat deviating from that of the inner face in magnitude, in order to provide the desired dioptric power. In the outer rim portion R, the curvatures or radii, respectively, deviate from the central values in the following manner: On the outer face, an annular part 4 with stronger (inward) curvature, thus smaller radius, is radially contiguous to the central portion. To this part, another may be outwards contiguous which is again less curved, conical (thus non-curved) or slightly outwardly (i.e. negatively) curved portion 5. In terms of magnitude, the curvature here is always less (i.e. the radius larger) than in the first mentioned transition region 4, i.e. the lens terminates smoothly.

The inner face 1 also has an annular region radially contiguous to the central region with the elliptical face, which, however, is less curved, thus more flattish, corresponding to a larger radius of curvature in this region. Herein, the radius of curvature in a sectional plane is meant, which plane contains the optical axis of the lens. The line formed by the inner face and the sectional plane forms a point of inflection 6, i.e. the curvature of the line first becomes zero and then positive. For the Gaussian surface curvature, this means a transition to negative values. To this region, the region is contiguous, where the inner face of the contact lens approaches to the global tangential plane; here, the curvature in the main section perpendicular to the radial sectional plane is zero, so that the Gaussian surface curvature becomes zero and still further outside, in the immediate edge region, again transitions to positive values.

Between these two points (in the sectional plane) or lines (on the surface), respectively, of curvature inflection 6 and 7, there is a region in which the contact lens gradually lifts, when viewed radially from inner to outer region, from the cornea. This region is crucial for the wearing comfort. As recognized by the inventors, in this region there should neither be formed an overly sharp edge, which might interrupt the film of tear liquid present on the cornea or might even cut into the cornea; nor should the rim region have an outwardly pointed, protruding, strongly curved edge ("Skispitzen-Profil"), which might irritate the eyelid slipping onto it from outwards during blinking. Rather, the annular regions according to the invention, smoothly transitioning towards an outer edge free from any sharp edges, (see FIG. 3) achieve an unperturbed floating of the contact lens onto the tear liquid film and at the same time enable an unperturbed slipping of the eyelid onto the contact lens. It was found that the radius of the inner face, i.e. the inverse curvature, along the radial sectional plane, is for example between 0.1 and 4 mm, or above 0.5 mm on the one hand or/and below 2 mm on the other hand. The radial extension of the negatively curved area region may be 1 μm to 1 mm, for example more than 10 μm on the one hand or/and below 100 μm on the other hand. The outer edge itself may include, instead of one acute angle 8, two obtuse angles, between which an approximately cylindrical outer rim region 9 extends for e. g. 10-30 μm as discernible from FIG. 3.

In FIG. 4, a flow diagram of a process according to the invention is shown. Initially, a female and a male mold are provided, and a precursor material for poly(dimethylsiloxane) is brought into female mold, closed with the male part, and polymerized at a temperature between 15° C. 160° C. for 12 720 min. S1 (molding). After the closing, the mold parts are rotated with respect to one another by 180° or another angle sufficiently large) (>20°), as long as the reaction mixture is just viscous (over 1000 cP; typically ca. 4000 cP), so that excess silicone is reliably separated and displaced into the annular space between the mold parts. In this separation, the rim contour described above is created due to the effect of the surface energy, allowing the dispensing with an edge cutting step or other edge treatment creating a cutting edge (e.g. punching). For demolding, the contact lens is partially swollen with an alkane such as e.g. hexane or another nonpolar or little polar solvent S3, so that it releases S5 without mechanical action from the mold and the manufacturing parts. The dipole moment of the solvent should not be more than 0.2 Debye to this end. In support, an ultrasonic: bath may be employed. The starting material may be a liquid 2 component silicone by NuSil with a DK value of above 700 barrer. After evaporating the solvent in vacuum, the lens is steam sterilized at above 120° C., if desired.

In FIG. 5, a two-part mold is shown, which is suitable for carrying out the above described process. The lower, female part 10 initially accommodates the reaction mixture and is then closed with the upper, male part 12, wherein a space 11 filled with the reaction mixture remains between them. The lower part 10 has chamfers 13', 13" facilitating the fitting together and separating the mold parts 10 and 12. The annular space is indicated as 14.

From the proceedings of the process an irregularity of the outer results insofar as it deviates from an exact circle line, other than known e.g. from punched lens contours. Because also the cornea never has exactly regular contours, this deviation from an ideal shape not only is not detrimental, but even has beneficial effects on the wearing comfort. The amount of the irregularity may be quantified by assigning, by calculation, an ideally approximating circle line to the projection of the outer rim, according to the criterion of a minimum sum of the squared deviations. The, the average square deviation is a measure of the irregularity, and is at least 5000 $\mu m^2$ (converted to magnitudes: about 1% of half the lens diameter), but in embodiments may be more than 1000 $\mu m^2$ or more than 10000 $\mu m^2$.

The contact lens formed according to the invention may be used as a cover lens, i.e. with or without refractive power for physically protecting the cornea from irritations. This may be useful as a flanking, itself non-therapeutic measure for a medicinal-therapeutic eye treatment.

In the subsequent claims, "mainly consisting" is understood as a mass proportion of more than 50%, in particular of more than 90% up to entirely. "Curvature" is in each case the inverse radius of curvature, i.e. the radius of the approaching circle, wherein the sign is positive for convex surfaces and is negative for concave surfaces. The Gaussian surface curvature is the product of the two principal curvatures, thus is negative when both the principal curvatures have different signs (saddle surface), and is zero when one or both principal curvatures are zero (e.g. cylinder and conus surface).

The skilled person will realize that deviations from the embodiments described above are possible without leaving the scope of protection of the appended claims.

What is claimed is:

1. A silicone contact lens, a radial cross section of the inner surface of which has a rim region between a point of inflection and an outer rim of the contact lens, in which a cross sectional contour is convex, wherein a radius of the convex cross sectional contour is larger than 0.5 mm, and wherein the outer rim of the contact lens shows an irregularity inasmuch as a circle line ascribed to the outer edge according to the criterion of least square deviations has an average squared deviation of at least 1000 $\mu m2$.

2. The contact lens of claim 1, wherein a central portion of the inner surface of the contact lens is formed elliptically prolate.

3. The contact lens of claim 2, wherein a conic constant is between −0.1 and −0.5.

4. The contact lens of claim 1, wherein the rim region is 1 $\mu m$ to 1 mm in width.

5. The contact lens of claim 4, wherein the rim region is 0.01 mm in 0.1 mm in width.

6. The contact lens of claim 1, wherein the radius of the convex cross sectional contour is up to 10 mm.

7. The contact lens of claim 1, wherein the rim portion is located in a portion of the inner surface having a negative Gaussian surface curvature.

8. The contact lens of claim 1, wherein the silicone is poly-(dimethylsiloxane).

9. The contact lens of claim 1, being a bandage contact lens for protecting the cornea.

10. A process for manufacturing the silicone contact lens of claim 1, wherein a female mold part and a male mold part are provided and a silicone precursor material is introduced in between the mold parts and is polymerized in place, wherein the polymerized contact lens is released from the mold parts by means of a liquid swelling the contact lens, and is finalized without generating a cutting edge.

11. A process for manufacturing a silicone contact lens, wherein a female mold part and a male mold part are provided and a silicone precursor material is introduced in between the mold parts and is polymerized in place, wherein while the reaction mixture is still liquid, the mold parts are rotated with respect to one another for separating the portion of the reaction mixture intended for forming the contact lens from excess material, wherein the polymerized contact lens is released from the mold by means of a liquid swelling the contact lens, and is finalized without generating a cutting edge.

12. The process of claim 11, wherein the mold halves are rotated by more than 20°, when the reaction mixture has a viscosity of more than 1000 cP.

13. The process of claim 11, wherein a non-polar liquid is used for releasing the contact lens from the mold.

14. The process of claim 13, wherein the dipole moment of the non-polar liquid is less than 0.2 Debye.

15. The process of claim 11, wherein the released contact lens is treated with a polar liquid.

16. The process of claim 15, wherein the dipole moment of the polar liquid is more than 1 Debye.

17. The process of claim 11, comprising using the contact lens as a bandage contact lens for protecting the cornea.

18. The process of claim 17, wherein the mold imparts an elliptically prolate shape to a central part of the inner surface of the contact lens.

19. A silicone contact lens manufactured according to the process of claim 11, a radial cross section of the inner surface of which contact lens has a rim region between a point of inflection and an outer rim of the contact lens, in which a cross sectional contour is convex, wherein a radius of the convex cross sectional contour is larger than 0.5 mm.

20. The contact lens of claim 19, being a bandage contact lens for protecting the cornea.

* * * * *